United States Patent [19]
Otsuka et al.

[11] 3,803,071
[45] Apr. 9, 1974

[54] PROCESS FOR MANUFACTURING 3,3-DIALKYDIAZACYCLOPROPANES

[75] Inventors: Masatomi Otsuka, Naruto; Seizo Komura, Tokushima; Hideo Yamaguchi, Naruto; Hidetoshi Kume, Naruto; Toshikatsu Minami, Naruto; Takashi Kawasaki, Naruto, all of Japan

[73] Assignee: Otsuka Kagaku Yukuhin Kabushiki Kaisha, Osaka, Japan

[22] Filed: Sept. 20, 1971

[21] Appl. No.: 182,119

Related U.S. Application Data

[63] Continuation of Ser. No. 698,116, Jan. 16, 1968, abandoned.

[30] Foreign Application Priority Data
Jan. 26, 1967  Japan.................................. 42-5309

[52] U.S. Cl......................................... 260/239 AA
[51] Int. Cl............................................ C07d 45/00
[58] Field of Search ............................. 260/239 AA

[56] References Cited
UNITED STATES PATENTS
3,415,882  12/1968  Jenkins et al....................... 260/239
FOREIGN PATENTS OR APPLICATIONS
1,493,838  7/1967  France............................... 260/239
1,150,743  4/1969  Great Britain...................... 260/239

OTHER PUBLICATIONS

Britton, Hydrogen Ions, (New York, 1929), pages 132–133 and 168–171. (Chem. Library).

Ephraim, Inorganic Chemistry, (Sixth English Edition), (New York, 1954), pages 278–279, (Chem. Library).

Kirk–Othmer, Encyclopedia of Chemical Technology, (Second Edition, New York, 1964), Vol. 4, pages 11–13; Vol. 12, page 429.

*Primary Examiner*—Alton D. Rollins
*Attorney, Agent, or Firm*—Stephens, Huettig & O'Connell

[57] ABSTRACT

In manufacturing a 3,3-dialkyldiazacyclopropane by the reaction of ammonia, chlorine and ketone, an improvement comprising using a hypochlorite as a chlorine source and carrying out the reaction in the presence of an ammonium salt of an inorganic acid while maintaining a pH value of the reaction system between 10 and 13 during the reaction. The 3,3-dialkyldiazacyclopropanes prepared by the method of the invention are useful as starting materials for preparing hydrazine hydrate, hydrazine salts and other hydrazine derivatives.

4 Claims, No Drawings

PROCESS FOR MANUFACTURING 3,3-DIALKYDIAZACYCLOPROPANES

This is a continuation of application Ser. No. 698,116, filed Jan. 16, 1968, now abandoned.

This invention relates to an improved process for manufacturing 3,3-dialkyldiazacyclopropanes useful as starting materials for preparing hydrazine hydrate, hydrazine salts and other hydrazine derivatives.

Heretofore, 3,3-dialkyldiazacyclopropanes have been generally prepared by introducing chlorine gas into an aqueous or organic solvent solution of ammonia and ketone. When methylethyl ketone is used as a ketone, for example, the reaction is expressed by the following formula:

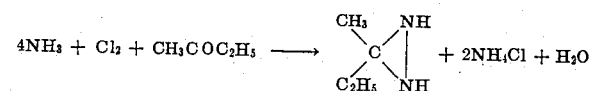

According to such conventional method, however, there is the risk of explosion by the direct contact of ammonia and chlorine gas and further the ketone used may be decomposed by oxidation with chlorine gas, reducing the yield rate of the desired product as well as the utility of the ketone.

An object of the invention is to provide a process for manufacturing 3,3-dialkyldiazacyclopropanes safely free from the risk of explosion.

Another object of the invention is to provide a process for manufacturing 3,3-dialkyldiazacyclopropanes, in which said products can be obtained selectively in a high yield and in a high concentration which could not be attained in the prior art.

A further object of the invention is to provide a process for manufacturing 3,3-dialkyldiazacyclopropanes, in which the ketones used are utilized effectively in the production reaction of said 3,3-dialkyldiazacyclopropanes without decomposition and/or condensation of the ketones.

A still further object of the invention is to provide a process for manufacturing 3,3-dialkyldiazacyclopropanes, in while bleaching powder and like inexpensive hypochlorite can be used as a chlorine source and the chlorine generated therefrom can be utilized effectively in the reaction to produce said 3,3-dialkyldiazacyclopropanes, rendering the manufacture of such product economical.

These and the other objects of the invention will be apparent from the following description.

According to the researches of the present inventors, it has been found that when hypochlorite is used as a chlorine source and reacted with ammonia and ketone in the presence of an ammonium salt of an inorganic acid under a pH value of 10 to 13, the desired 3,3-dialkyldiazacyclopropanes are obtainable selectively in a high yield and in a form of high concentration solution without any danger of explosion.

This invention is based on the above new discoveries and characterized by using a hypochlorite as a chlorine source and carrying out the reaction of ammonia, ketone and hypochlorite to produce 3,3-dialkyldiazacyclopropanes in the presence of an ammonium salt of an inorganic acid while maintaining a pH value of the reaction system between 10 and 13.

When calcium hypochlorite is used, the reaction involved in the process of the invention is essentially expressed by the following equation:

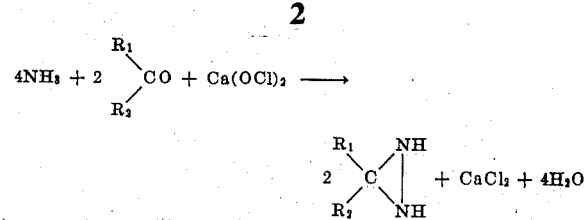

wherein $R_1$ and $R_2$ are alkyl group of 1 to 4 carbon atoms and total number of the carbon atoms of $R_1$ and $R_2$ is in the range of 2 to 5.

In the invention as the hypochlorite can be used various salts of hypochloric acid, such as calcium hypochlorite, sodium hypochlorite, potassium hypochlorite, etc. The preferred examples are bleaching powder, bleaching liquor, high test bleaching powder, sodium hypochlorite, etc. The hypochlorite may be used in a form of powder, aqueous solution and aqueous suspension. In the invention, since the hypochlorite is used as a chlorine source the danger of explosion and the decomposition of the starting ketone due to chlorine gas can be eliminated and further the manufacture of 3,3-dialkyldiazacyclopropane is rendered economical.

The ketones used in the invention are those having the general formula:

wherein $R_1$ and $R_2$ are as defined before. The representatives are acetone, methylethyl ketone, dimethyl ketone, methylisopropyl ketone, methylisobutyl ketone, etc. The ketone may be usually used in an amount of more than 0.9 mole, preferably 1.2 to 4.0 moles, per mole of available chlorine in the starting hypochlorite.

The ammonia may be used in the form of ammonia water and ammonia gas and generally employed in an amount of 3 to 20 moles, preferably 4 to 10 moles, per mole of available chlorine in the starting hypochlorite.

In the invention it is essential to carry out the reaction in the presence of an ammonium salt of an inorganic acid while maintaining the pH of the reaction system between 10 and 13, whereby the desired 3,3-dialkyldiazacyclopropanes are produced selectively in a high yield. If the reaction is carried out in the absence of the salt the pH value of the reaction system increases as high as more than 13 due to the production of a strong alkaline intermediate, such as calcium hydroxide, so that there may be produced hydrazones or azines predominantly which will be partially decomposed with the starting hypochlorite during the reaction, reducing the yield rate of the desired product considerably. When the reaction is carried out in the presence of the ammonium salt in accordance with the process of the invention, however, such strong alkaline intermediate is neutralized immediately with the ammonium salts to prevent the undesired rising of the pH of the reaction system and maintain the pH in the range of 10 to 13, thus making it possible to produce the products, 3,3-dialkyldiazacyclopropanes, selectively in a high yield. The preferred ammonium salts used in the invention are ammonium chloride, ammonium nitrate, ammonium sulfate and ammonium phosphate, most desirable being ammonium chloride. The preferable amount of the ammonium salt varies over a wide range, but it is used in an amount sufficient to maintain the pH of the reaction system to 10 to 13, preferably 10.5 to 12, during the whole period of the reaction.

The process of the invention can be conducted by a batch system or continuous manner. According to one of the preferred procedures for carrying out the process of the invention, hypochlorite is added with stirring at a temperature of below 40° C., preferably 10° to 35° C. in the form of powder, solution or suspension to a mixed solution of ammonia water, ketone and ammonium salt of inorganic acid, and then the reaction is continued at 10° to 80° C., preferably 40° to 80° C., for about 0.5 to 4 hours, and thus the desired 3,3-dialkyldiazacyclopropane is obtained in a form of solution. Usually the product is contained in the resultant solution in a concentration of 4 to 10 percent by weight calculated as hydrazine hydrate, and 10 to 30 percent by weight calculated as hydrazine hydrate on the basis of the weight of the water contained in the solution.

Prior to the reaction gluey substance, such as gelatine and the like, may be added to the reaction system, as required.

For a fuller understanding of the invention Examples are given below.

Example 1

To a mixture of 486g of 28 weight percent ammonia water, 116g of acetone and 53g of ammonium chloride was added with violent stirring in 30 minutes 444g of aqueous suspension of 118.4g of bleaching powder containing 60 weight percent of available chlorine suspended in water. The temperature of the system was maintained at 30° C. water-cooled during the addition. Thereafter the system was heated at about 40° C. for 1 hour, whereby 67g of 3,3-dimethyldiazacyclopropane was obtained in a form of solution. The yield rate calculated as hydrazine hydrate was 93 mole percent relative to the available chlorinecontained in the starting bleaching powder used, and the concentration of the product in the solution was 4.65 percent by weight calculated as hydrazine hydrate.

For comparison the reaction was carried out in the same manner as in Example 1, except that no ammonium chloride was used. The production of 3,3-dimethyldiazacyclopropane was not observed, but acetone azine was obtained.

Example 2

To a mixture of 2,190g of 28 weight percent ammonia water, 576g of methylethyl ketone and 214g of ammonium chloride were added with violent stirring in 30 minutes 10 ml of 5 weight percent of gelatine and 444g of bleaching powder containing 64 weight percent of available chlorine. The reaction temperature of the system was gradually raised but it was maintained at 20° to 25° C. during the addition. Thereafter the mixture was heated at about 40° C. for 2 hours, whereby 330g of 3-methyl-3-ethyldiazacyclopropane was obtained. The yield rate calculated as hydrazine hydrate was 96 mole percent, based on the available chlorine contained in the starting bleaching powder, and the concentration of the product in the resultant solution was 5.78 percent by weight calculated as hydrazine hydrate.

Example 3

To a mixture of 60g of 28 weight percent ammonia water, 66g of ammonium sulfate, 144g of methylethyl ketone and 100ml of water were added with violent stirring at 25° to 30° C. in 30 minutes 85g of ammonia gas and 592g of sodium hypochlorite solution containing 12 weight percent available chlorine. Thereafter the system was heated at 45° O. for 2 hours, whereby 75.7g of 3-methyl-3-ethyldiazacyclopropane was obtained in a form of solution. The yield rate calculated as hydrazine hydrate was 88 mole percent relative to the available chlorine contained in the sodium hypochlorite solution, and the concentration of the product in the resultant solution was 4.35 percent by weight calculated as hydrazine hydrate.

Example 4

To a mixture of 46g of 28 weight percent ammonia water, 26g of methylisopropyl ketone and 12g of ammonium nitrate was added with violent stirring at 20° to 25° C. in 20 minutes 17g of bleaching powder containing 10.65g of available chlorine, after which the system was heated at 40° C. for 1 hour, whereby 3-methyl-3-isopropyldiazacyclopropane solution was obtained. The yield rate calculated as hydrazine hydrate was 86 mole percent relative to the available chlorine contained in the starting bleaching powder.

What we claim is:

1. In manufacturing a 3,3-dialkyldiazacyclopropane by the reaction of ammonia, chlorine and ketone, the improvement which comprises using a hypochlorite as a chlorine source and adding sufficient ammonium salt selected from the group consisting of ammonium chloride, ammonium nitrate ammonium sulfate and ammonium phosphate to neutralize the strong alkaline intermediate formed during the reaction.

2. The process of manufacturing a 3,3-dialkyldiazacyclopropane according to claim 1 in which said ammonium salt is ammonium chloride.

3. The process of manufacturing 3,3-dialkyldiazacyclopropane according to claim 1, in which said hypochlorite is at least one of the group consisting of calcium hypochlorite, sodium hypochlorite and potassium hypochlorite.

4. The process of manufacturing 3,3-dialkyldiazacyclopropane according to claim 1, in which said hypochlorite is one member of the group consisting of bleaching powder, bleaching liquor and high test bleaching powder.

* * * * *